(12) United States Patent
Smirnov

(10) Patent No.: US 11,726,297 B2
(45) Date of Patent: Aug. 15, 2023

(54) CAMERA MODULE

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 195 days.

(21) Appl. No.: 17/491,852

(22) Filed: Oct. 1, 2021

(65) Prior Publication Data

US 2022/0236518 A1    Jul. 28, 2022

(30) Foreign Application Priority Data

Jan. 22, 2021 (KR) .................. 10-2021-0009594

(51) Int. Cl.
*G02B 7/182* (2021.01)
*G02B 27/64* (2006.01)
(Continued)

(52) U.S. Cl.
CPC ......... *G02B 7/1805* (2013.01); *G02B 27/646* (2013.01); *G03B 5/00* (2013.01);
(Continued)

(58) Field of Classification Search
USPC ...................................... 396/55; 348/208.99
See application file for complete search history.

(56) References Cited

U.S. PATENT DOCUMENTS 5,822,122 A * 10/1998 Kuno ...................... G03B 5/00
                                                                 359/557
8,351,771 B2 * 1/2013 Ito ........................ G02B 7/023
                                                                 359/554
(Continued)

FOREIGN PATENT DOCUMENTS

CN         210142222 U    3/2020
KR     10-2018-0041040 A    4/2018
(Continued)

OTHER PUBLICATIONS

Korean Office Action dated Apr. 7, 2022 in corresponding Korean Patent Application No. 10-2021-0009594 (6 pages in English, 4 pages in Korean).

*Primary Examiner* — Clayton E. LaBalle
*Assistant Examiner* — Warren K Fenwick
(74) *Attorney, Agent, or Firm* — NSIP Law

(57) ABSTRACT

A camera module includes: a housing; a first frame rotatably mounted in the housing; a second frame rotatably mounted on the first frame; a reflective member mounted on the second frame; a first driver including a first magnet installed on either one of the housing and the first frame, and a first coil opposing the first magnet; and a second driver including a second magnet installed on either one of the housing and the second frame, and a second coil opposing the second magnet. The first frame is configured to rotate in a first axial direction perpendicular to an incident direction of light incident to the reflective member. The second frame is configured to rotate in a second axial direction parallel to an incident direction of light incident to the reflective member.

15 Claims, 7 Drawing Sheets

(51) Int. Cl.
    *G03B 13/36*     (2021.01)
    *G03B 5/00*     (2021.01)
    *G02B 7/18*     (2021.01)
    *G03B 17/17*     (2021.01)

(52) U.S. Cl.
    CPC ............ *G03B 13/36* (2013.01); *G03B 17/17* (2013.01); *G03B 2205/0007* (2013.01); *G03B 2205/0023* (2013.01); *G03B 2205/0069* (2013.01)

(56) References Cited

U.S. PATENT DOCUMENTS

| | | | |
|---|---|---|---|
| 9,846,036 B2 * | 12/2017 | Kim | ............ G01C 19/5733 |
| 10,394,046 B2 * | 8/2019 | Jeong | ............ G02B 27/646 |
| 10,700,119 B2 | 6/2020 | Hu et al. | |
| 2018/0109660 A1 | 4/2018 | Yoon et al. | |
| 2018/0275366 A1 * | 9/2018 | Cheng | ............ G02B 7/023 |
| 2018/0356645 A1 | 12/2018 | Jeong et al. | |
| 2019/0212632 A1 | 7/2019 | Miller | |

FOREIGN PATENT DOCUMENTS

| | | |
|---|---|---|
| KR | 10-1892857 B1 | 8/2018 |
| KR | 10-2019-0071569 A | 6/2019 |
| KR | 10-2020-0053958 A | 5/2020 |
| WO | WO 2019/117652 A1 | 6/2019 |

\* cited by examiner

CAMERA MODULE

CROSS-REFERENCE TO RELATED APPLICATIONS

This application claims the benefit under 35 U.S.C. § 119(a) of Korean Patent Application No. 10-2021-0009594 filed on Jan. 22, 2021 in the Korean Intellectual Property Office, the entire disclosure of which is incorporated herein by reference for all purposes.

BACKGROUND

1. Field

The following description relates to a camera module.

2. Description of Related Art

Recently, a camera module has been employed in portable electronic devices such as smartphones, tablet PCs, laptops, and the like, and an autofocusing function, an image stabilization function, and a zoom function have been added to such a camera module.

However, to implement various functions, a structure of a camera module has been complicated, and a size of the camera module has increased, such that a size of the portable electronic device on which the camera module is mounted has also increased.

With the growth of the smartphone camera market, attempts to reduce the sizes of components implementing the functions of a general manual camera, such as autofocusing (AF) and optical zoom, so as to integrate the functions have continuously been made. According to structural variations for such attempts, there has been demand for OIS driving methods, other than a general OIS method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a first frame rotatably mounted in the housing; a second frame rotatably mounted on the first frame; a reflective member mounted on the second frame; a first driver including a first magnet installed on either one of the housing and the first frame, and a first coil opposing the first magnet; and a second driver including a second magnet installed on either one of the housing and the second frame, and a second coil opposing the second magnet. The first frame is configured to rotate in a first axial direction perpendicular to an incident direction of light incident to the reflective member. The second frame is configured to rotate in a second axial direction parallel to an incident direction of light incident to the reflective member.

The first axial direction may pass through one point of a path of the light incident to the reflective member. The second axial direction may be spaced apart from the path of the light incident to the reflective member.

The first frame may be coupled to the housing by a first hinge member.

The first hinge member may include a plurality of first hinge members. The reflective member may be disposed between the plurality of first hinge members.

The second frame may be coupled to the first frame by a second hinge member.

The second frame may be coupled to the first frame by a hinge member.

The hinge member may be disposed between an internal surface of the first frame and an external surface of the second frame.

The second frame may include a reflective member installation portion on which the reflective member is installed, a first extension portion extending from one side of the reflective member installation portion, and a second extension portion extending downwardly from an end of the first extension portion. Either one of the second magnet and the second coil may be disposed on an external surface of the second extension portion.

The other one of the second magnet and the second coil may be disposed on a side wall of the housing opposing the second extension portion.

The first frame may include a main frame portion connected to the second frame, an installation portion disposed below the reflective member, and a connection portion connecting the main frame portion to the installation portion.

Either one of the first magnet and the first coil may be installed in the installation portion. The other one of the first magnet and the first coil may be installed on an opposing surface of the housing opposing the installation portion.

The housing may include an installation base supporting the first frame.

The first driver may further include a first yoke disposed to overlap the first magnet. The second driver may further include a second yoke disposed to overlap the second magnet.

The camera module may further include: a lens unit disposed on a rear side of the reflective member on the path of light; and an image sensor disposed on a rear side of the lens unit on the path of the light.

The camera module may be mounted on a portable electronic device such that an optical axis of the lens unit extends in a direction perpendicular to a direction from a front surface of the portable electronic device to a rear surface of the portable electronic device.

Other features and aspects will be apparent from the following detailed description, the drawings, and the claims.

BRIEF DESCRIPTION OF DRAWINGS

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Figure 1:
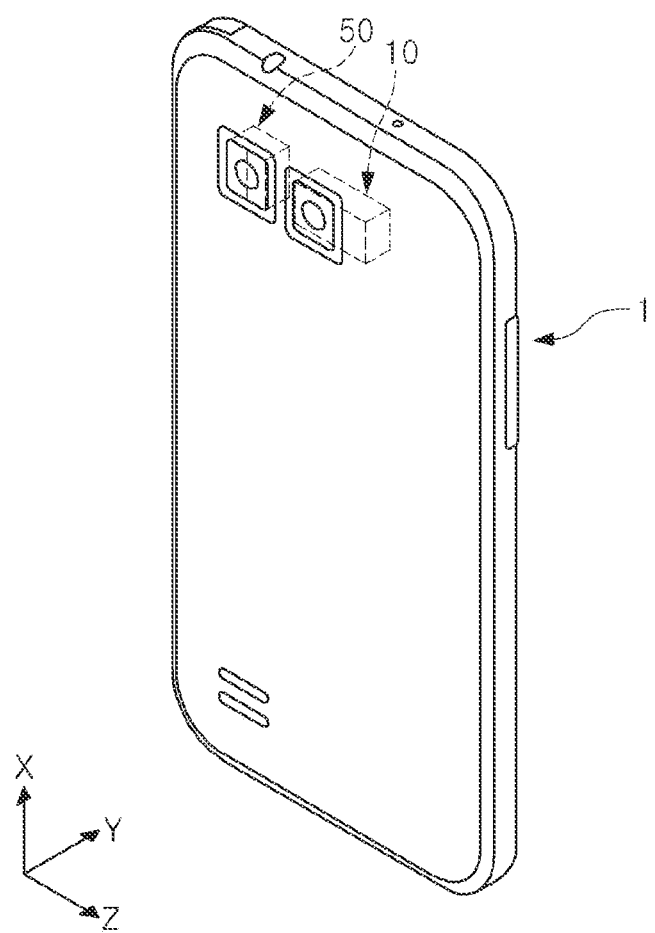
FIG. 1 is a perspective diagram illustrating a portable electronic device, according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of this disclosure. Further, although the examples described herein have a variety of configurations, other configurations are possible as will be apparent after an understanding of this disclosure.

FIG. 1 is a perspective diagram illustrating a portable electronic device, according to an example embodiment.

Referring to FIG. 1, a portable electronic device 1 may be a portable electronic device such as, for example, a mobile communication terminal, a smartphone, or a tablet PC. For example, the portable electronic device 1 may include a camera module 10 and another camera module 50, to image a subject.

In the example embodiment shown in FIG. 1, the camera module 10 may include a plurality of lenses, and an optical axis (Z-axis) of the plurality of lenses may extend in a direction perpendicular to a thickness direction (Y-axis direction, a direction directed from a front surface to a rear surface of the portable electronic device 1, or an opposite direction thereof) of the portable electronic device 1.

For example, the optical axis (Y-axis) of a plurality of lenses provided in the other camera module 50 may be arranged in the thickness direction (Y-axis direction) of the portable electronic device 1.

Therefore, even when the camera module 10 includes functions such as autofocusing (hereinafter, AF), zooming, and optical image stabilizing (hereinafter, OIS), the thickness of the portable electronic device 1 may not increase. Accordingly, the portable electronic device 1 may have a reduced size.

The camera module 10 according to an example embodiment may include any one or any combination of any two or more of AF, zooming, and OIS functions.

The camera module 10 having AF, zoom, and OIS functions may have various components, such that a size of the camera module 10 may increase as compared to a general camera module.

When the size of a camera module increases, it may be difficult to reduce the size of a portable electronic device in which the camera module is mounted.

For example, in a camera module, the number of stacked lenses may increase for the zoom function, and when the plurality of stacked lenses are stacked in the thickness direction of the portable electronic device, the thickness of the portable electronic device may also increase according to the number of stacked lenses. Accordingly, when the thickness of the portable electronic device is not increased, a sufficient number of stacked lenses may not be provided, such that the zooming performance may be weakened.

Also, to implement the AF and OIS functions, an actuator for moving a lens group in the optical axis direction or in a direction perpendicular to the optical axis may need to be installed, and when the optical axis (Y-axis) of the lens group is arranged in the thickness direction of the portable electronic device, an actuator for moving the lens group may also need to be installed in the thickness direction of the portable electronic device. Accordingly, the thickness of the portable electronic device may increase.

However, in the camera module 10, the optical axis (Z-axis) of the plurality of lenses may be disposed to be perpendicular to the thickness direction of the portable electronic device 1. Therefore, even when the camera module 10 including the AF, zoom and OIS functions is mounted, the portable electronic device 1 may have a reduced size.

Figure 2:
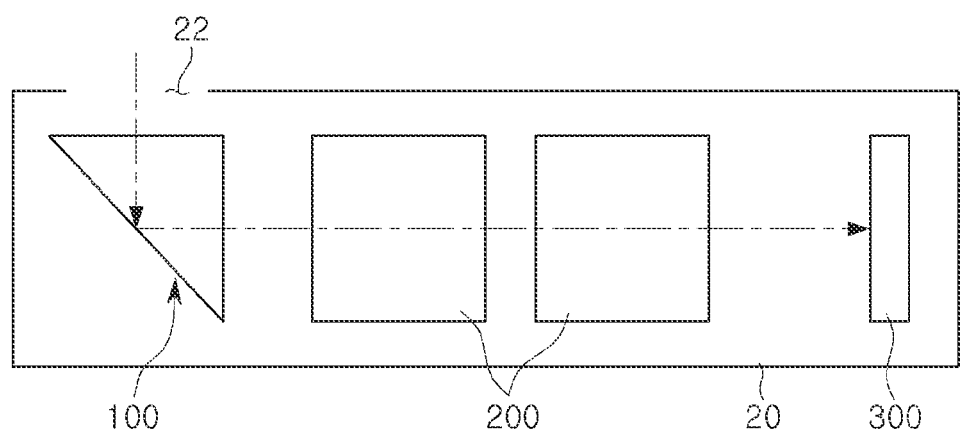
FIG. 2 is a diagram illustrating a camera module, according to an embodiment.
Figure 2:
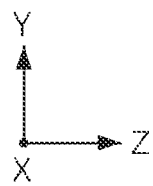
Figure 3:
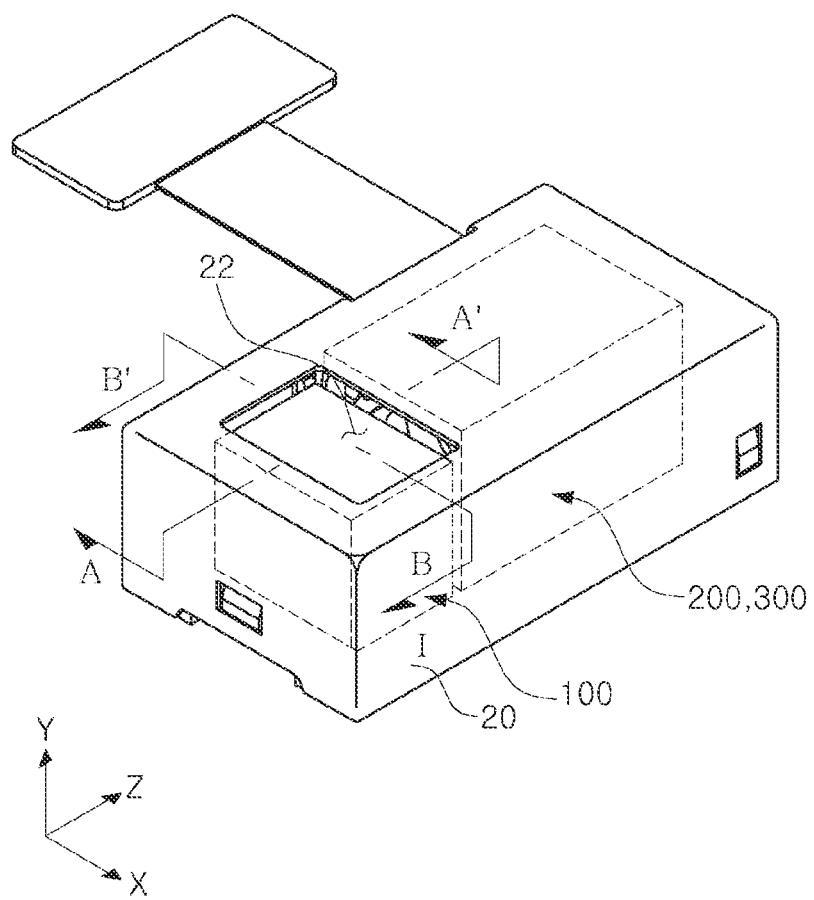
FIG. 3 is a perspective diagram illustrating the camera module of FIG. 1.

FIG. 2 is a diagram illustrating the camera module 10, according to an example embodiment. FIG. 3 is a perspective diagram illustrating the camera module 10.

Referring to FIGS. 2 and 3, the camera module 10 may include a reflective module 100, a lens module 200 and an image sensor 300 disposed in a housing 20.

The reflective module 100 may be configured to change a traveling direction of light. For example, the traveling direction of light incident through an opening 22 provided in the housing 20 enclosing the camera module 10 may change to be directed toward the lens module 200 by the reflective module 100. To this end, the reflective module 100 may include a reflective member 140 (see FIG. 4) configured to reflect light.

For example, the path of light incident in the thickness direction (Y-axis direction) of the camera module 10 may change to coincide (or substantially coincide) with the optical axis (Z-axis) direction by the reflective module 100.

The lens module 200 may include a plurality of lenses through which light of which the traveling direction has been changed by the reflective module 100 may pass. For example, the lens module 200 may include first and second lens modules 210 and 220 including the plurality of lenses. However, the disclosure is not limited to this example configuration of the lens module 200, and the lens module 200 may include only one lens module, or may include two or more lens modules.

As an example, the lens module 200 may be installed to be able to slide in the housing 20 in the optical axis (Z-axis) direction. To this end, the lens module 200 may include an AF driver (not illustrated). For example, the AF driver may include an AF magnet (not illustrated) and an AF coil (not illustrated). Accordingly, the AF function may be performed.

The image sensor 300 may be configured to convert light passing through the plurality of lenses into an electrical signal, and the image sensor 300 may be mounted on a printed circuit board (not illustrated). Also, an optical filter (not illustrated) configured to filter light incident from the lens module 200 may be disposed on the front end of the image sensor 300. The optical filter (not illustrated) may be an infrared cut-off filter.

In the internal space of the housing 20, the reflective module 100 may be provided on a front side of the lens module 200 around the lens module 200, and the image sensor 300 may be provided on a rear side of the lens module 100.

Figure 4:
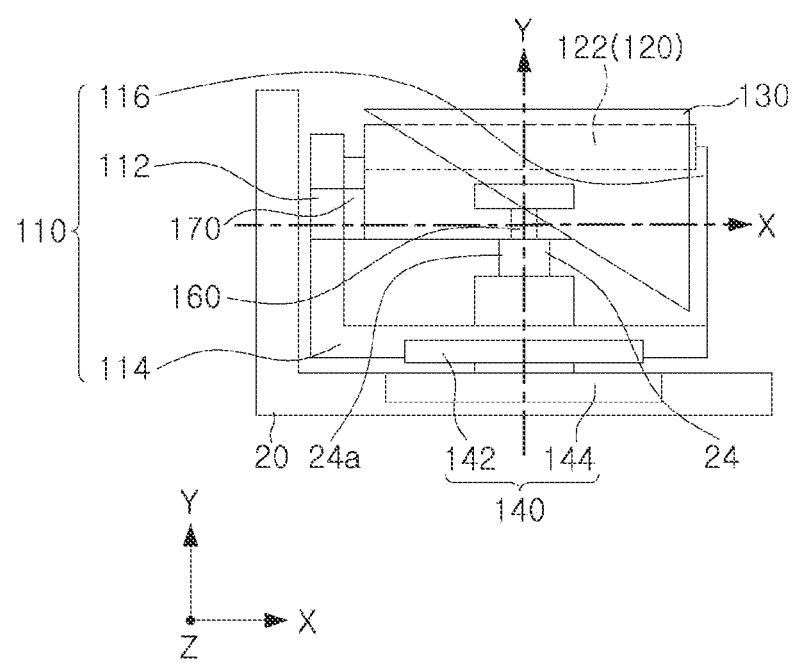
FIG. 4 is a cross-sectional diagram taken along line A-A' in FIG. 3.
Figure 5:
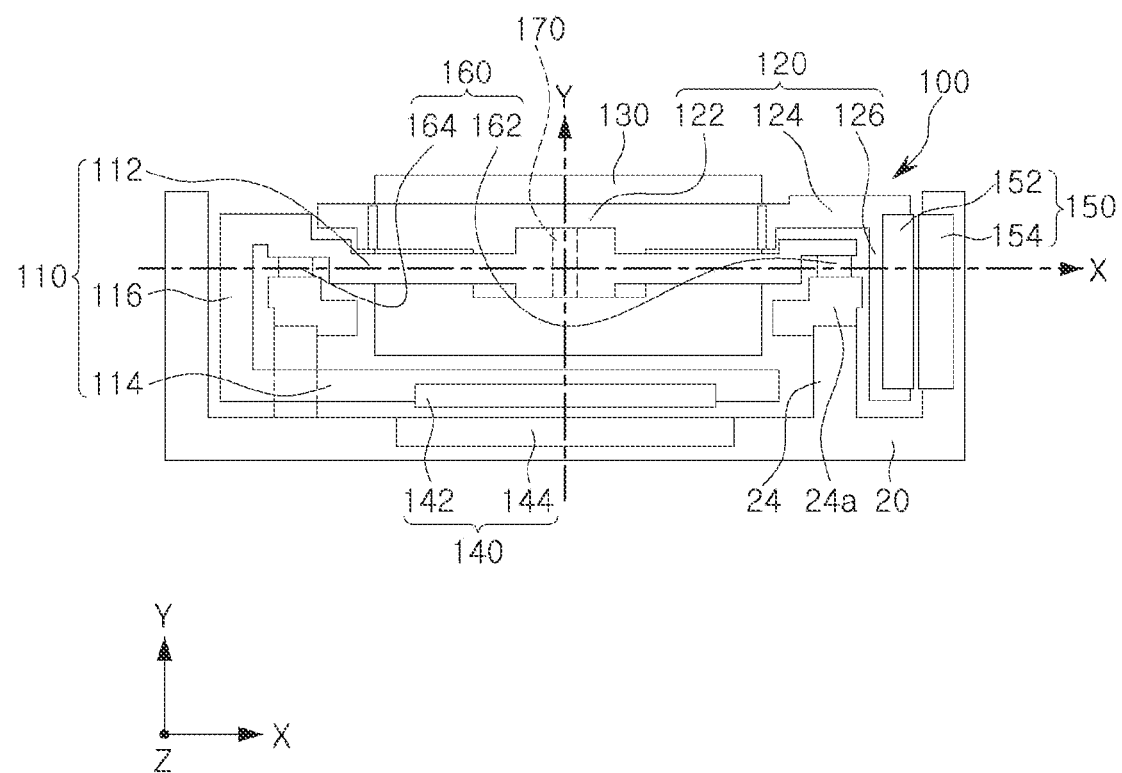
FIG. 5 is a cross-sectional diagram taken along line B-B' in FIG. 3.
Figure 6:
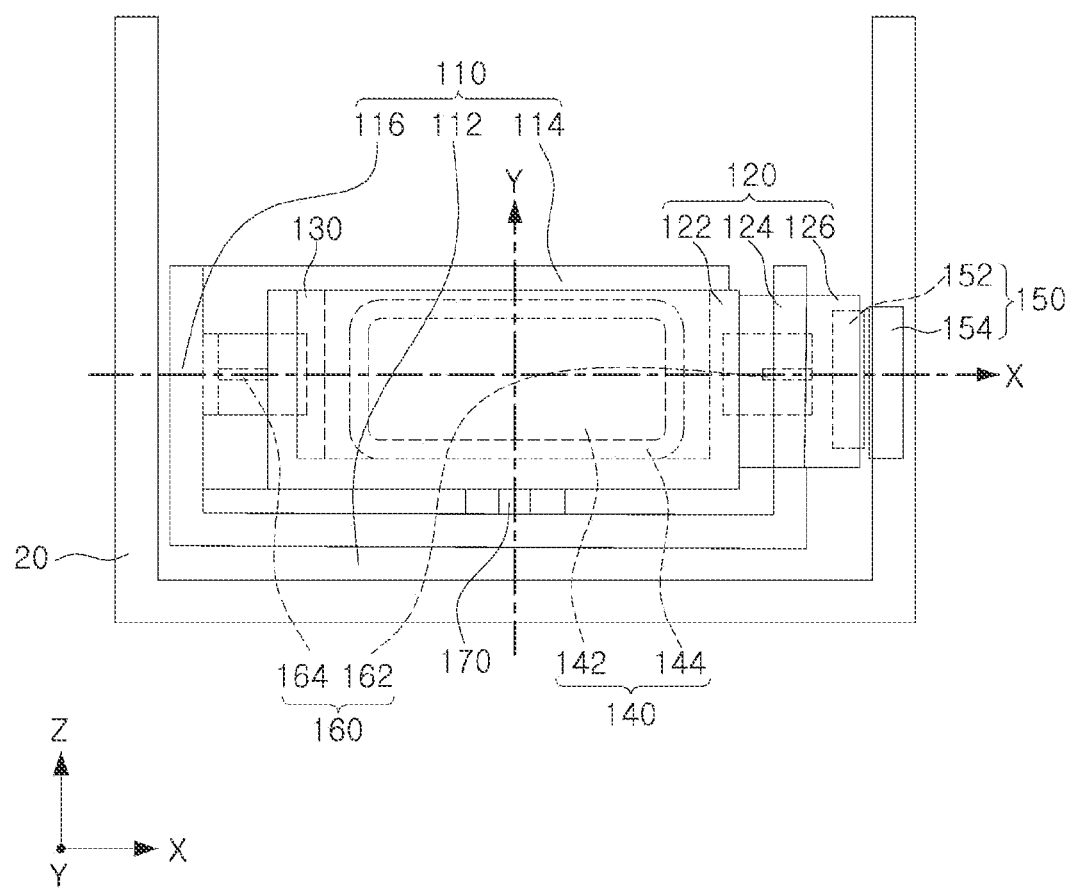
FIG. 6 is a plan diagram illustrating a reflective module, according to an embodiment.
Figure 7:
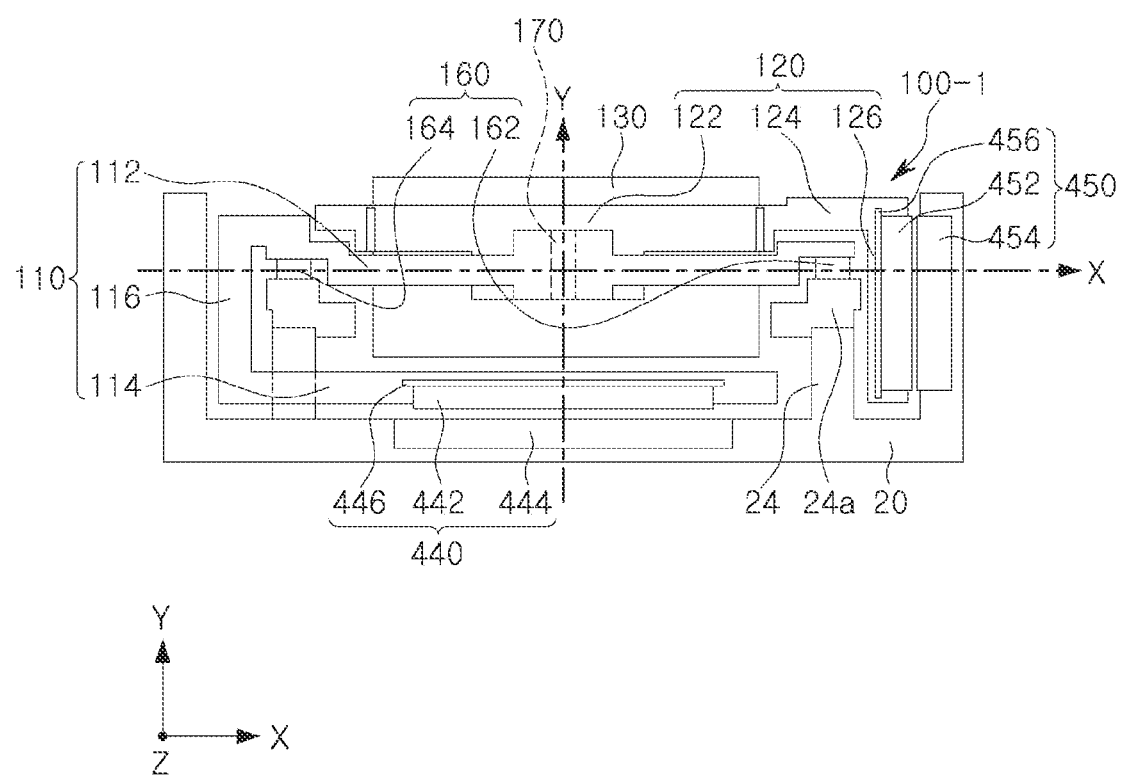
FIG. 7 is a diagram illustrating a reflective module, according to an embodiment.

FIG. 4 is a cross-sectional diagram taken along line A-A' in FIG. 3. FIG. 5 is a cross-sectional diagram taken along line B-B' in FIG. 3. FIG. 6 is a plan diagram illustrating a reflective module. FIG. 7 is a diagram illustrating a reflective module, according to another embodiment.

As illustrated in FIG. 3, the reflective module 100 may be disposed below the opening 22 of the housing 20.

Referring to FIGS. 4 to 6, for example, the reflective module 100 may include a first frame 110, a second frame 120, a reflective member 130, a first driver 140 and a second driver 150.

The first frame 110 may be rotatably installed in the housing 20. As an example, the first frame 110 may rotate about a first axial direction (X-axis direction) perpendicular to the incident direction (Y-axis direction) of light incident to the reflective member 130. Also, the first axial direction, which may be the rotational axis of the first frame 110, may be disposed to pass through one of points of the path of light incident to the reflective member 130. The first frame 110 may include, for example, a main frame portion 112, an installation portion 114, and a connection portion 116.

The main frame portion 112 may be connected to the first frame 120 and may be disposed to surround a region other than one side of the reflective member 130. The main frame 112 may be installed on an installation base 24 of the housing 20 by a first hinge member 160. As an example, the first hinge member 160 may include a 1-1 hinge member 162 disposed on one side of the main frame 112 and a 1-2 hinge member 164 disposed on the other side of the main frame 112. Also, the reflective member 130 may be disposed between the 1-1 hinge member 162 and the 1-2 hinge member 164. In the example embodiment, the first hinge member 160 may include two hinges, but the disclosure is not limited to this embodiment, and the number of hinge members may be varied.

Also, a mounting member 24a for installation of the hinge member 160 may be provided on the installation base 24 of the housing 20.

The installation portion 114 may be disposed below the reflective member 130, and one of the components included in the first driver 140 may be installed in the installation portion 114. A detailed description of the first driver 140 will be provided later.

The connection portion 116 may connect the main frame 120 to the installation portion 114, and may extend from one side of the main frame 112.

The second frame 120 may rotatably installed on the first frame 110. As an example, the second frame 120 may rotate about a second axial direction (Y-axis direction) parallel to the incident direction of light incident to the reflective member 130. The second axial direction, which is the rotational axis of the second frame 120, may be spaced apart from the path of light incident to the reflective member 130. The second frame 120 may include, for example, a reflective member installation portion 122, a first extension portion 124, and a second extension portion 126.

The reflective member 130 may be installed in the reflective member installation portion 122. As an example, the reflective member installation portion 122 may be disposed to surround a side surface and a rear surface of the reflective member 130 other than an upper surface and a front surface of the reflective member 130. Also, a second hinge member 170 may be disposed between the rear surface of the reflective member installation portion 122 and the first frame 110, and the reflective member installation portion 122 may rotate from the first frame 110 by the second hinge member 170.

The first extension portion 124 may be configured to extend from one side surface of the side surfaces of the reflective member installation portion 122.

The second extension 126 may be configured to extend downwardly from an end of the first extension 124. As an example, one of the components included in the second driver 150 may be installed in the second extension portion 126. A detailed description of the second driver 150 will be provided later.

The reflective member 130 may be installed on and fixed to the second frame 120 and may have a triangular pole shape. The reflective member 130 may be configured to change the traveling direction of light incident through the opening 22 of the housing 20 to the side of the lens module 200. For example, the path of light incident to the reflective member 130 (light traveling in the Y-axis direction) may change to coincide (or substantially coincide) with the optical axis (Z-axis) direction by the reflective member 130. As described above, since the reflective member 130 is installed on and fixed to the second frame 120, the reflective member 130 may rotate in two axial directions. Accordingly, the OIS function may be implemented. As an example, the reflective member 130 may be implemented by a prism.

The first driver 140 may be disposed below the reflective member 130. As an example, the first driver 140 may include a first magnet 142 installed on one of the housing 20 and the first frame 110, and a first coil 144 disposed opposite to the first magnet 142 (e.g., on the other one of the housing 20 and the first frame 110). In the example, the first magnet 142 may be installed on a bottom surface of the installation portion 114 of the first frame 110, and the first coil 144 may be installed on an opposing surface (e.g., a top surface) of a portion of the housing 20 disposed opposite to the bottom surface of the installation portion 114 of the first frame 110. However, the disclosure is not limited to the foregoing embodiment, and the installation positions of the first magnet 142 and the first coil 144 may be varied.

As an example, the size of the first coil 144 may be larger than the size of the first magnet 142. Accordingly, the first frame 110 may rotate by interaction between the first magnet 142 and the first coil 144. In this case, as described above, the first frame 110 may rotate about the first axial direction (X-axis direction) perpendicular to the incident direction of light incident to the reflective member 130.

The second driver 150 may be disposed on the side surface of the reflective member 130. As an example, the second driver 150 may include a second magnet 152 installed on one of the housing 20 and the second frame 120, and a second coil 154 disposed opposite to the second magnet 152 (e.g., on the other one of housing 20 and the second frame 120). In the example embodiment, the second magnet 152 may be installed on an external surface of the second extension 126 of the second frame 120, and the second coil 154 may be installed on an opposing surface (e.g., an internal surface) of a portion of the housing 20 disposed opposite to an external surface of the second extension 126 of the second frame 120.

As an example, the size of the second coil 154 may be larger than the size of the second magnet 152. Accordingly, the second frame 120 may rotate by interaction between the second magnet 152 and the second coil 154. In this case, as described above, the first frame 120 may rotate about the second axial direction (Y-axis direction) parallel to the incident direction of light incident to the reflective member 130.

As described above, the OIS function of the camera module 10 may be implemented through the reflective member 130 rotating about two axes. Accordingly, miniaturization of the camera module 10 may be implemented.

FIG. 7 is a diagram illustrating a reflective module, according to another embodiment.

Referring to FIG. 7, in a reflective module 100-1, a first driver 440 may be disposed below the reflective member 130. As an example, the first driver 440 may include a first magnet 442 installed on one of the housing 20 and the first frame 110, a first coil 444 disposed opposite to the first magnet 442 (e.g., on the other one of the housing 20 and the first frame 110), and a first yoke 446 disposed on the first magnet 442.

As an example, the size of the first coil 444 may be greater than the size of the first magnet 442. Accordingly, the first frame 110 may rotate by interaction between the first magnet 442 and the first coil 444. In this case, as described above, the first frame 110 may rotate about the first axial direction (X-axis direction) perpendicular to the incident direction of light incident to the reflective member 130.

A second driver 450 may be disposed on the side of a side surface of the reflective member 130. As an example, the second driver 450 may include a second magnet 452 installed on one of the housing 20 and the second frame 120, a second coil 454 disposed opposite to the second magnet 452 (e.g., on the other one of housing 20 and the second frame 120), and a second yoke 456 disposed on a rear surface of the second magnet 452.

As an example, the size of the second coil 554 may be larger than the size of the second magnet 552. Accordingly, the second frame 120 may rotate by interaction between the second magnet 552 and the second coil 554. In this case, as described above, the first frame 120 may rotate about the second axial direction (Y-axis direction) parallel to the incident direction of light incident to the reflective member 130.

According to the aforementioned example embodiments, miniaturization of a camera module may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a first frame rotatably mounted in the housing;
   a second frame rotatably mounted on the first frame;
   a reflective member mounted on the second frame;
   a first driver including a first magnet installed on one of the housing and the first frame, and a first coil opposing the first magnet; and a second driver including a second magnet installed on one of the housing and the second frame, and a second coil opposing the second magnet,
wherein the first frame is configured to rotate in a first axial direction perpendicular to an incident direction of light incident to the reflective member, and the second frame is configured to rotate in a second axial direction parallel to an incident direction of light incident to the reflective member.

2. The camera module of claim 1, wherein the first axial direction passes through one point of a path of the light incident to the reflective member, and the second axial direction is spaced apart from the path of the light incident to the reflective member.

3. The camera module of claim 1, wherein the first frame is coupled to the housing by a first hinge member.

4. The camera module of claim 3, wherein the first hinge member comprises a plurality of first hinge members, and the reflective member is disposed between the plurality of first hinge members.

5. The camera module of claim 4, wherein the second frame is coupled to the first frame by a second hinge member.

6. The camera module of claim 1, wherein the second frame is coupled to the first frame by a hinge member.

7. The camera module of claim 6, wherein the hinge member is disposed between an internal surface of the first frame and an external surface of the second frame.

8. The camera module of claim 1, wherein the second frame includes a reflective member installation portion on which the reflective member is installed, a first extension portion extending from one side of the reflective member installation portion, and a second extension portion extending downwardly from an end of the first extension portion, and wherein either one of the second magnet and the second coil is disposed on an external surface of the second extension portion.

9. The camera module of claim 8, wherein the other one of the second magnet and the second coil is disposed on a side wall of the housing opposing the second extension portion.

10. The camera module of claim 1, wherein the first frame includes a main frame portion connected to the second frame, an installation portion disposed below the reflective member, and a connection portion connecting the main frame portion to the installation portion.

11. The camera module of claim 10, wherein either one of the first magnet and the first coil is installed in the installation portion, and
wherein the other one of the first magnet and the first coil is installed on an opposing surface of the housing opposing the installation portion.

12. The camera module of claim 1, wherein the housing includes an installation base supporting the first frame.

13. The camera module of claim 1, wherein the first driver further includes a first yoke disposed to overlap the first magnet, and
wherein the second driver further includes a second yoke disposed to overlap the second magnet.

14. The camera module of claim 1, further comprising:
a lens unit disposed on a rear side of the reflective member on the path of light; and
an image sensor disposed on a rear side of the lens unit on the path of the light.

15. The camera module of claim 14, wherein the camera module is mounted on a portable electronic device such that an optical axis of the lens unit extends in a direction perpendicular to a direction from a front surface of the portable electronic device to a rear surface of the portable electronic device.

* * * * *